United States Patent

Crocker

[11] 3,976,102
[45] Aug. 24, 1976

[54] HOSE BIB SELECTOR VALVE WITH HOSE DRAINING FEATURE

[76] Inventor: Nathan E. Crocker, 2019 Azalea Drive, Goldsboro, N.C. 27530

[22] Filed: Apr. 25, 1975

[21] Appl. No.: 571,759

[52] U.S. Cl. .......................... 137/625.47; 137/360
[51] Int. Cl.² ...................................... F16K 11/083
[58] Field of Search ............ 137/625.22, 360, 290, 137/302

[56] References Cited
UNITED STATES PATENTS

| | | | |
|---|---|---|---|
| 312,155 | 2/1885 | O'Herin | 137/625.22 |
| 664,463 | 12/1900 | Campbell | 137/625.22 |
| 1,077,697 | 11/1913 | Gates | 137/625.22 X |
| 2,334,141 | 11/1943 | Zierden | 137/360 X |
| 2,625,173 | 1/1953 | Hodes | 137/360 |
| 3,023,768 | 3/1962 | Niemi | 137/290 |

*Primary Examiner*—Henry T. Klinksiek
*Attorney, Agent, or Firm*—Clarence A. O'Brien; Harvey B. Jacobson

[57] ABSTRACT

A selector valve assembly is provided including a hollow body provided with a liquid inlet and first and second outlets. The inlet includes structure for sealed communication with the outlet of a hose bib and the first outlet of the valve assembly includes structure for sealed communication with the inlet end of a hose. The valve body has a valve element shiftable therein between first, second and third positions and is operative (1) when in the first position to communicate the valve body inlet with the valve body second outlet and to block communication between the valve body first outlet and the valve body second outlet and valve body inlet, (2) when in the second position to communicate the valve body inlet with the valve body first outlet and block communication between the valve body second outlet and valve body inlet and first outlet and (3) when in the third position to communicate the valve body first and second outlets and to block communication between the valve body inlet and the valve body first and second outlets.

5 Claims, 4 Drawing Figures

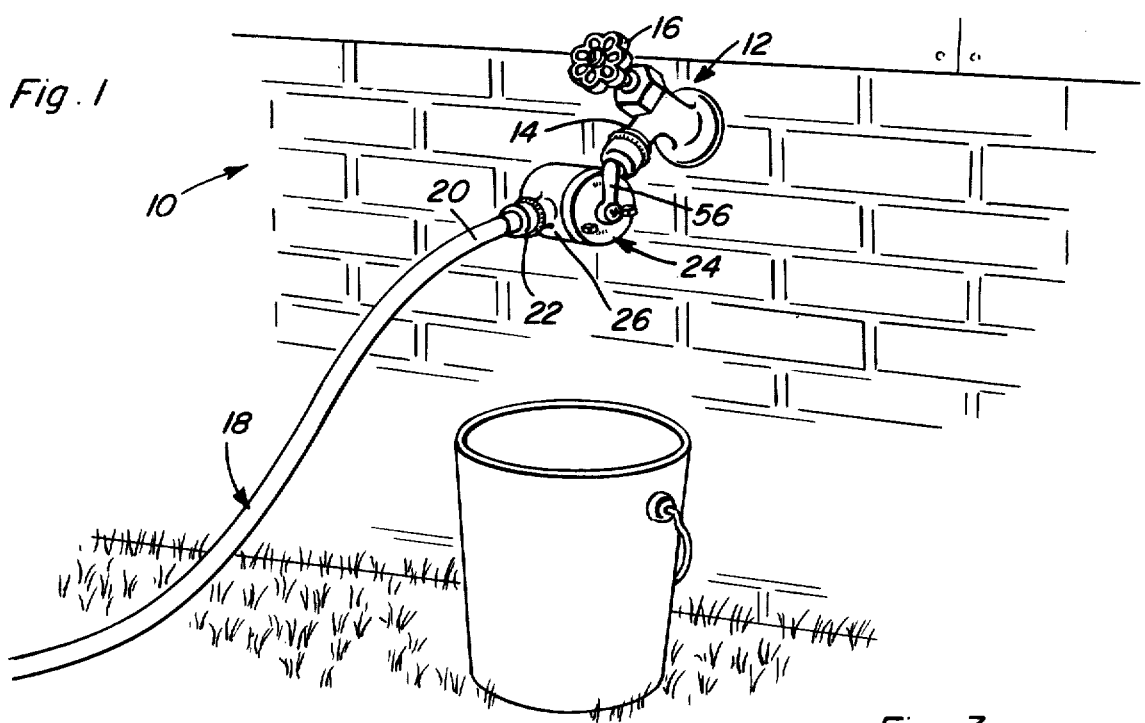
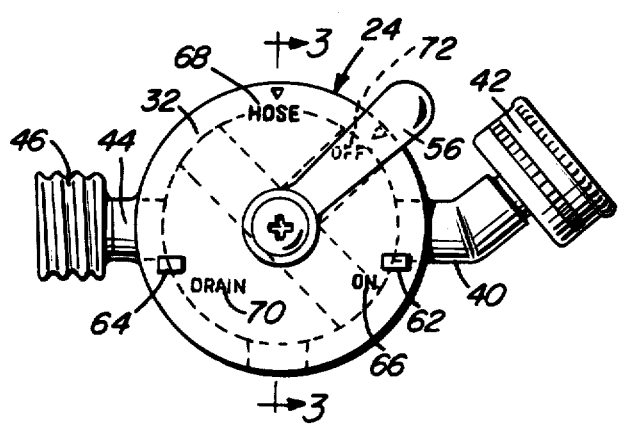
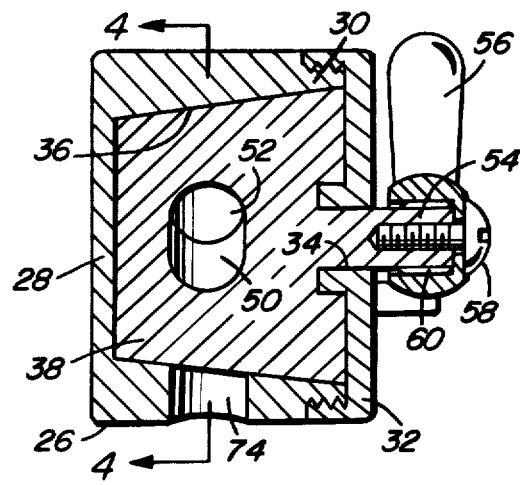
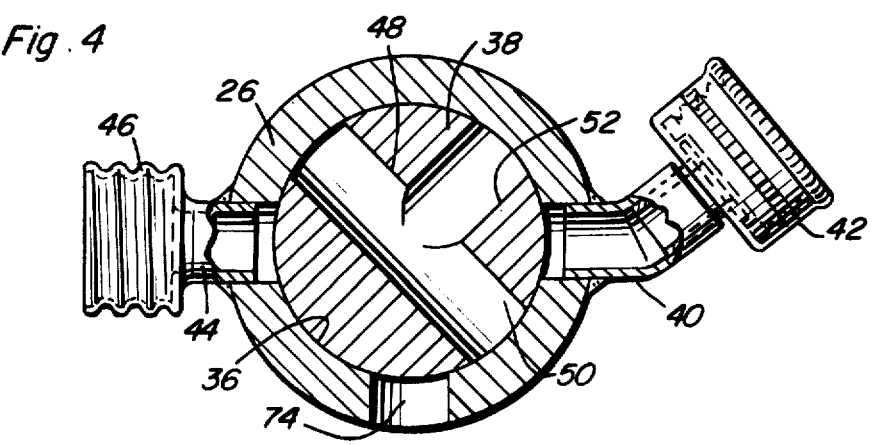

HOSE BIB SELECTOR VALVE WITH HOSE DRAINING FEATURE

BACKGROUND OF THE INVENTION

Various forms of multi-position fluid flow control valves have been heretofore designed and have been intended for usage in various environments. Examples of previously patented valve assemblies including some of the structural features of the instant invention are disclosed in U.S. Pat. Nos. 586,955, 618,051, 877,181, 1,077,697, 1,369,466 and 1,417,808.

However, these variously constructed valve assemblies have not been specifically designed for use in conjunction with a hose bib and an associated hose and for the various purposes to be hereinafter more fully set forth.

BRIEF DESCRIPTION OF THE INVENTION

The selector valve assembly of the instant invention has been primarily designed for use in conjunction with a hose bib and an associated hose. The valve assembly includes a supplemental water outlet whereby a pail or other receptacle disposed beneath the valve assembly may have water from the hose bib discharged thereinto without water passing from the hose bib into the associated hose. Further, the valve assembly includes a valve element whereby communication between the hose bib and the associated hose may be established while at the same time blocking communication between the supplemental outlet and the hose bib and hose. Further, the valve element is also shiftable to a position communicating the suplemental outlet with the associated hose and blocking communication between the hose bib and the hose and supplemental outlet.

The main object of this invention is to provide a selector valve assembly for operative association with a hose bib and an attendant hose and constructed in a manner whereby the valve assembly and hose bib downstream from the associated valve thereof may be drained, communication may be established between the hose bib and the attendant hose and the attendant hose may be drained from the inlet end thereof.

Another object of this invention, in accordance with the immediately preceding object, is to provide a valve assembly which may be readily operatively associated with existing hose bibs and hoses.

A final object of this invention to be specifically enumerated herein is to provide a valve assembly in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a hose bib installation with the selector valve assembly of the instant invention operatively associated with the hose bib and an attendant flexible hose;

FIG. 2 is a side elevational view of the valve assembly;

FIG. 3 is an enlarged vertical sectional view taken substantially upon the plane indicated by the section line 3—3 of FIG. 2; and FIG. 4 is a vertical sectional view taken substantially upon the plane indicated by the section line 4—4 of FIG. 3.

DETAILED DESCRIPTION OF THE INVENTION

Referring now more specifically to the drawings the numeral 10 generally designates a wall of a building structure from which a conventional form of hose bib referred to in general by the reference numeral 12 is supported. The hose bib 12 includes an inlet (not shown) disposed inwardly of the wall 10, an outlet 14 and a valve 16 intermediate the inlet and outlet for variably controlling the flow of water through the hose bib 12. Of course, the inlet (not shown) of the hose bib 12 is suitably communicated with a source of water under pressure.

The numeral 18 generally designates a flexible hose of any conventional design and the hose 18 includes an inlet end 20 and an outlet end (not shown). The inlet end 20 includes a rotatable female coupling 22 of conventional design which is internally threaded and the outlet 14 of the hose bib 12 is externally threaded.

The numeral 24 generally designates the selector valve assembly of the instant invention and the assembly 24 includes a generally cylindrical valve body 26 closed at one end by means of a fixed end wall 28 and open at its other end. The open end of the valve body 26 includes an externally threaded diametrically reduced neck 30 to which a removable end wall 32 is threadedly secured. The end wall 32 is centrally apertured as at 34 and the interior of the valve body 26 defines a frusto-conical cavity or recess 36 closed at its major diameter end by means of the removable end wall 32.

A generally frusto-conical valve element 38 is seated and rotatably received in the recess 36 and one side of the body 26 includes an outwardly projecting inlet neck 40 opening inwardly into the recess 36 at its inner end and equipped with a rotatable internally threaded female coupling 42 at its outer inlet end. The opposite side of the body 26 includes an outwardly projecting outlet neck 44 which is externally threaded as at 46 and opens inwardly into the recess 36.

The internally threaded and rotatable female coupling 42 is tightly removably threadedly secured to the outlet 14 of the hose bib 12 and the internally threaded rotatable coupling 22 is tightly threadedly engaged with the outlet end of the outlet neck 44.

The valve element 38 includes a T-shaped passage 48 formed therein including a first diametric leg 50 and a second radial leg 52 whose inner end opens into the longitudinal center portion of the diametric leg 50. Further, the large diameter end of the valve element 38 includes an axially outwardly projecting operating stem 54 which is rotatably received through the center aperture 34 in the removable end wall 32 and the outer end of the stem 54 has a crank handle 56 removably attached thereto by means of a fastener 58, the crank handle 56 and stem outer end portion including coacting splines 60 keying the crank handle 56 to the stem 54 for oscillation therewith.

The outer surface of the removable end wall 32 includes a pair of stop lugs 62 and 64 as well as indicia 66, 68, 70 and 72 for a purpose to be hereinafter more fully set forth.

From FIGS. 2, 3 and 4 of the drawings it may be seen that the valve body 26 includes a radial outlet 74 on the lower side thereof which opens inwardly into the recess 36 and is evenly circumferentially spaced about the lower side of the valve body 26 between the inlet neck 40 and the outlet neck 44.

When the handle 56 is swung to the three o'clock position as viewed in FIG. 2 of the drawings with the handle 56 engaged with the abutment 62, communication between the inlet neck 40 and the port 74 is established by means of the passage 48. In addition, communication between the outlet neck 44 and the port 74 or inlet neck 40 is blocked. Thus, when the valve 16 is on, water may flow from the hose bib 12, through the valve body 26 and outwardly of the port 74. Of course, when the valve 16 is closed, water may drain from the outlet 14 of the hose bib 12 and the interior of the valve assembly 24 through the port 74. However, when the handle 56 is in the twelve o'clock position as viewed in FIG. 2, communication is established between the inlet neck 40 and the outlet 44 and communication between the port 74 and the outlet neck 44 or the inlet neck 40 is blocked. Thus, when the valve 16 is open water may flow freely from the hose bib 12 through the valve body 26 and into the hose 18.

When the handle 56 is in the nine o'clock position as viewed in FIG. 2, communication between the inlet neck 40 and the outlet neck 44 as well as the port 74 is blocked and communication is established between the outlet neck 44 and the port 74. Thus, when the hose is being coiled back up into an elevated storage position from the free end thereof water may drain freely from the hose through the valve assembly 24 and out the port 74.

On the other hand, when the handle 56 is in the solid line position thereof illustrated in FIG. 2 registered with the indicia 72 communication between the inlet neck 40 and the port 74 as well as the outlet neck 44 is blocked. Further, communication is also blocked between either the outlet neck 44 and the port 74 and the inlet neck 40.

By utilizing a hose bib including an inwardly recessed valve seat for the valve 16 the hose 18 may be used throughout cold winter months. When the hose is not in use and the valve 16 is in the off position, the handle 56 may be swung to the nine o'clock position as the hose 18 is being coiled into a stored condition and water will drain from the hose 18 through the valve assembly 24 and out the port 74. Then, after the hose 18 has been supported from a suitable rack (not shown) at an elevation above the hose bib 12, the handle 56 may be swung to the three o'clock position in order to drain the outlet 14 of the hose bib 12 and the inlet neck 40 of the assembly 24 through the port 74. Thus, there will be no water in either the hose bib 12, the assembly 24 or the hose 18 to freeze during sub-freezing weather. However, whenever it is desired to utilize the hose 18, it is merely necessary to swing the handle 56 to the twelve o'clock position and to thereafter open the valve 16. Of course, after each usage the hose 18 must be drained as well as the inlet neck 40 and valve body 26.

Further, in the construction of new houses and when it is desired to replace the hose bib 12 of an existing house or other building structure, the selector valve assembly 24 may be used in lieu of the hose bib 12. In such case, the inlet neck 40 may be straight, rather than angulated, and the outlet neck 44 may be downwardly angulated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a water supply pipe including a hose bib on the discharge end thereof having an outlet, a water hose having inlet and outlet ends, a selector valve assembly, said valve assembly including a hollow body provided with first and second outlets and an inlet coupled to said hose bib outlet, means sealingly connecting said inlet end of said water hose to first outlet of said body, said valve assembly including a valve element shiftable between first, second and third positions and including means operative (1) when in said first position, to communicate said valve body inlet with said valve body second outlet and to block communication between said valve body first outlet and said valve body second outlet and valve body inlet, (2) when in said second position to communicate said valve body inlet with said valve body first outlet and block communication between said valve body second outlet and said valve body inlet and first outlet and (3) when in said third position to communicate said valve body first and second outlets and to block communication between said valve body inlet and said valve body first and second outlets.

2. The combination of claim 1 wherein said valve element is also shiftable to a fourth position and operable when in said fourth position to block communication between said valve body inlet and said valve body first and second valve body outlets.

3. The combination of claim 2 wherein said fourth position comprises a position intermediate said second position and one of said first and third positions.

4. The combination of claim 1 wherein said second water outlet of said hollow body opens outwardly thereof below said valve element.

5. The combination of claim 1 wherein said valve body defines a generally truncated cone-shape interior, said valve element comprising a generally truncated cone-shaped member seated and rotatably received in said interior.

* * * * *